United States Patent [19]
Sako

[11] Patent Number: 5,517,477
[45] Date of Patent: May 14, 1996

[54] DATA RECORDING METHOD AND DATA REPRODUCING APPARATUS

[75] Inventor: Yoichiro Sako, Chiba, Japan

[73] Assignee: Sony Corporation, Tokyo, Japan

[21] Appl. No.: 185,780

[22] Filed: Jan. 24, 1994

Related U.S. Application Data

[63] Continuation of Ser. No. 761,865, Sep. 10, 1991, abandoned.

[30] Foreign Application Priority Data

Jan. 19, 1990 [JP] Japan ................................ 2-008511
Apr. 20, 1990 [JP] Japan ................................ 2-103048

[51] Int. Cl.⁶ ................................................ G11B 7/00
[52] U.S. Cl. ...................... 369/60; 369/50; 369/44.32
[58] Field of Search .............................. 369/44.32, 47, 369/48, 58, 59, 44.33, 43, 54, 50, 124, 60; 360/10.2, 36.1, 10.1, 36.2

[56] References Cited

U.S. PATENT DOCUMENTS

| | | | |
|---|---|---|---|
| 4,497,050 | 1/1985 | Beetstra | 369/59 |
| 4,796,247 | 1/1989 | Vogelsang | 369/44.32 |
| 4,849,833 | 7/1989 | Yoshimura et al. | 360/36.2 |
| 4,860,272 | 8/1989 | Nishikawa et al. | 369/48 |
| 4,982,390 | 6/1991 | Tanaka | 369/60 |
| 5,099,464 | 3/1992 | Maeda | 369/54 |
| 5,247,505 | 9/1993 | Shikichi et al. | 369/54 |
| 5,255,102 | 10/1993 | Fushiki | 369/58 |

FOREIGN PATENT DOCUMENTS

| | | |
|---|---|---|
| 0155970A1 | 10/1985 | European Pat. Off. . |
| 0196590 | 10/1986 | European Pat. Off. . |
| 0196590A3 | 10/1986 | European Pat. Off. . |
| 0249781A2 | 12/1987 | European Pat. Off. . |
| 0312406A2 | 4/1989 | European Pat. Off. . |
| 2136192 | 9/1984 | United Kingdom . |

*Primary Examiner*—Nabil Z. Hindi
*Attorney, Agent, or Firm*—Limbach & Limbach; Philip M. Shaw, Jr.

[57] ABSTRACT

A disc-shaped recording medium (1) is rotationally driven at a velocity equal to N times a rotational velocity of the medium corresponding to the transfer rate of reproduced data so that the same position on the disc-shaped recording medium is scanned M times by a reproducing head (3) so as to read out one track of data M times to store the read out data in a memory (8). One track of playback data are formed from the data stored in the memory and transmitted at a predetermined transfer rate to perform continuous data reproduction even if the reproducing head should be deviated from a track due to vibrations or the like.

A disc-shaped recording medium (21) is also rotationally driven at a velocity equal to N times a rotational velocity of the medium corresponding to the data transfer rate of continuous input data, the input data are stored in a memory (30) having a storage capacity not less than a predetermined volume and data of the predetermined volume stored in the memory are converted into record data having a data transfer rate equal to N times the data transfer rate so that the produced record data will be continuously recorded on the disc-shaped recording medium.

48 Claims, 5 Drawing Sheets

DATA RECORDING METHOD AND DATA REPRODUCING APPARATUS

This is a continuation of application Ser. No. 07/761,865 filed on Sep. 10, 1991, now abandoned.

TECHNICAL FIELD

This invention relates to an improved disc recording/reproducing apparatus for recording or reproducing data on or from a disc-shaped recording medium. More particularly, it relates to a data recording method and a data reproducing apparatus which compensate for vibrations or the like.

BACKGROUND ART

In a disc recording/reproducing apparatus for recording or reproducing data on or from a disc-shaped recording medium, such as a CD player for reproducing a compact disc, the compact disc or the disc-shaped recording medium is rotationally driven at a constant linear velocity (CLV) by a spindle motor, and a laser beam is irradiated along a track formed spirally on the disc-shaped recording medium, so that a music program (digital data) recording as rows of pits on the track are reproduced by detecting changes in intensity of the reflected light which are caused by the presence or absence of the pits.

On the other hand, the bit error rate at the time of data reproduction in a CD player may reach an order of $10^{-5}$.

Since an error detection code and an error correction code are employed for correcting errors to a more or less extent, no inconveniences may arise under ordinary operating environments.

However, in a car-laden CD player or a portable CD player, extremely large vibrations may be produced, in a manner different from a stationary type domestic CD player, such that servo control may fall into disorder (deservoeing) due to an optical head scanning a disc track deviating from the track (or being off-track) to interfere with normal data reproduction. In such case, a music program cannot be reproduced satisfactorily because error correction cannot be made or reproduction may be interrupted even with the aid of the error detection code and the error correction code.

Thus, in a disc reproducing apparatus, such as a CD player or video disc player, should the reproducing head be off-track due to vibrations or the like, a problem is presented that reproduction of a continuous information of a music program, video program or the like is interrupted.

For overcoming the problem, there is known a method comprising providing a large capacity buffer memory, transiently storing data reproduced by a reproducing head, such as music program data, in the buffer memory, and outputting the data stored in the buffer memory as playback data even when the reproducing head is off-track for continuously reproducing the music program. However, with this method, it is necessary to store data previously in the buffer memory prior to reproduction of the music program, so that music program reproduction cannot be started immediately. On the other hand, an increase in buffer memory capacity is prohibitive.

With a disc recording apparatus such as a magnetic disc apparatus, a write-once type optical disc apparatus or an overwrite type optical disc apparatus, data recording is discontinued when the magnetic head is off-track due to vibrations or the like, so that continuously supplied input data cannot be recorded.

In view of the above described status of the art, it is an object of the present invention to provide a data reproducing apparatus in which continuous data may be reproduced even when the reproducing head is off-track.

It is another object of the present invention to provide a disc recording apparatus in which continuously supplied data may be recorded correctly even when the recording head is off-track.

SUMMARY OF THE INVENTION

According to the present invention, the disc-shaped recording medium is rotationally driven at a velocity equal to N times a rotational velocity of the medium corresponding to a transfer rate of data recorded on the disc shaped recording medium, and the same position on the disc-shaped recording medium is reproduced M times by the reproducing head so as to read out data of a predetermined volume M times and to store the read-out data in a memory. The data of the predetermined volume is formed from the data stored in the memory and sent out at the predetermined data transfer rate. In this manner, continuous data may be reproduced even when the reproducing head of the disc reproducing apparatus employed in an operating environment subject to more or less severe vibrations should be off-track.

Also, according to the present invention, the disc-shaped recording medium is rotationally driven at a velocity equal to N times a rotational velocity of the recording medium corresponding to a transfer rate of continuously entered input data, the input data are stored in a memory having a storage capacity in excess of a predetermined volume, the data of the predetermined volume stored in the memory are converted into record data having a data transfer rate equal to N times the firstly mentioned transfer rate, and the produced data are recorded on the disc-shaped recording medium. These data are recorded on the recording medium during the time of storage of the input data of the next predetermined volume in the memory. In this manner, the continuously entered input data may be recorded correctly even when the recording head of a disc recording apparatus employed in an operating environment subject to more or less severe vibrations should be off-track.

BEST EMBODIMENT FOR PRACTICING THE INVENTION

By referring to the drawings, an embodiment of an optical disc reproducing apparatus according to the present invention will be explained.

Figure 1:
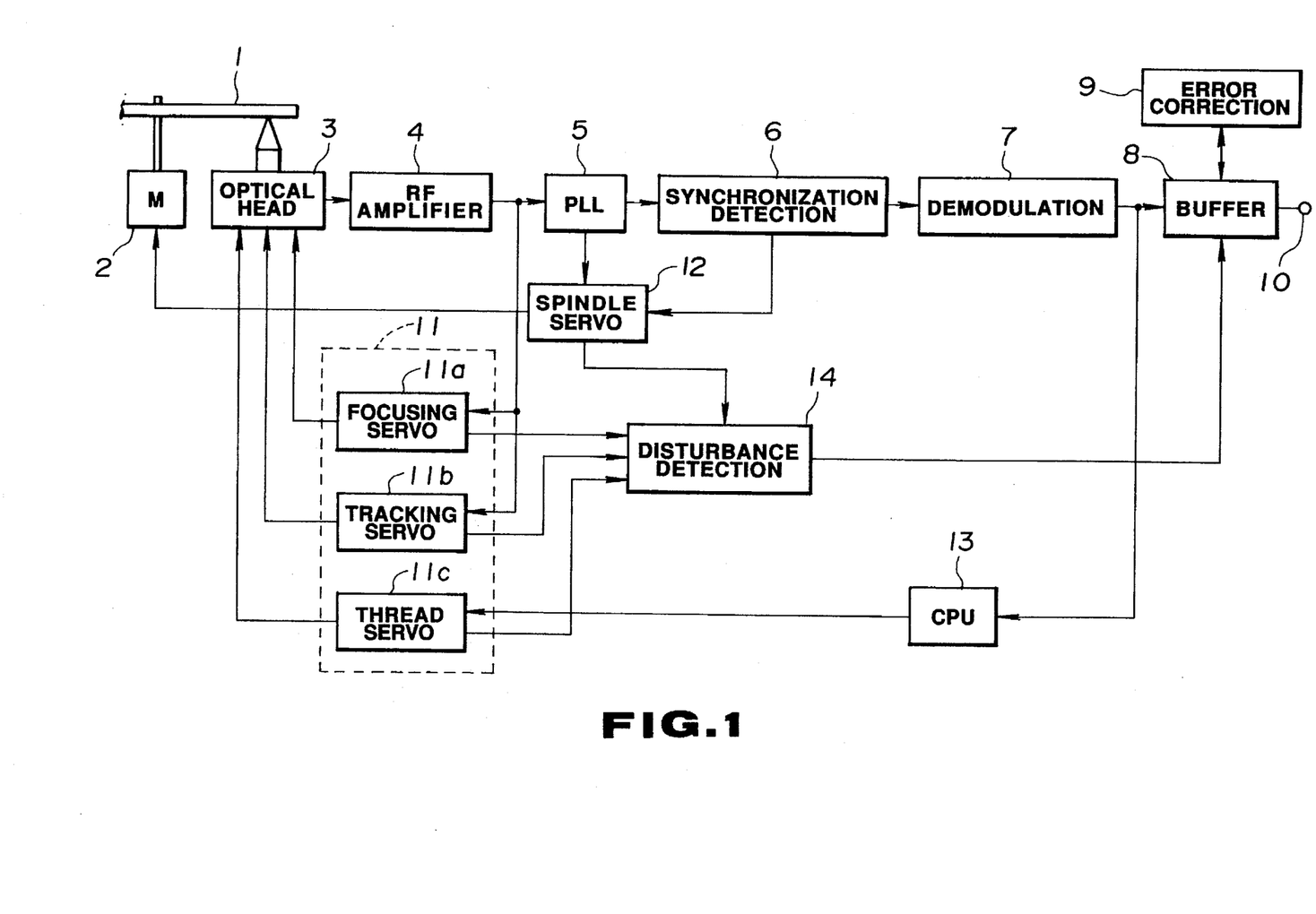
FIG. 1 is a block circuit diagram showing the construction of an optical head reproducing apparatus embodying the present invention.

FIG. 1 is a block circuit diagram showing an arrangement of an optical disc reproducing apparatus according to the present invention.

In the present optical disc reproducing apparatus, a disc 1 is rotationally driven by a spindle motor 2 at, for example, a constant linear velocity corresponding to N times the prescribed data transfer rate. The disc 1 is an optical disc for a CD player, for example, and a music program is recorded in the form of a train of pits along the disc track together with redundancy bits, such as CRC (cyclic redundancy code) and subcoding formed by frame synchronization signals, control bits and address bits.

An optical head 3 is constituted by optical components, such as a laser diode, collimator lens, object lens, beam splitter and a cylindrical lens, and split photodetectors, and is adapted for irradiating a laser beam on the recording surface of the disc 1 for detecting changes in intensity of the reflected light from the pits in cooperation with an RF circuit 4 arranged in a matrix configuration. The optical head 3 also detects focusing error signals such as by a so-called astigmatic method, while detecting tracking error signals such as by a so-called push-pull method.

The RF circuit 4 renders the reproduced signals from the optical head 3 into binary form signals, which are supplied to a clock reproducing circuit 5. The RF circuit 4 also transmits the focusing error signals and tracking error signals to a focusing servo control circuit 11A and a tracking servo control circuit 11B of a servo control circuit 11, respectively.

The focusing servo control circuit 11A actuates the object lens of the optical head 3 along the light axis so that the focusing error signal from the RF circuit 4 is reduced to zero, while the tracking servo control circuit 11B actuates the object lens of the optical head 3 along the disc radius so that the tracking error signal from the RF circuit 4 is reduced to zero.

The clock reproducing circuit 5 is constituted by a phase locked loop (PLL) and reproduces clock signal recorded on the disc 1 from the binary signals from the RF circuit 4.

A synchronization detection circuit 6 detects frame synchronization signals from the reproduced signals with the aid of clock signals from clock reproducing circuit 5 for achieving frame synchronization. The circuit 6 also provides for synchronization protection for preventing frame desynchronization caused by the inability of detecting frame synchronization signals under the effects of dropout or jitter.

A spindle motor servo control circuit 12 takes charge of a rotational control of the spindle motor 2 to cause locking of the PLL of the clock reproducing circuit 5 with the aid of clock signals from the clock reproducing circuit 5 and the frame synchronization signals from the frame synchronization detection circuit 6.

A demodulating circuit 7 processes the above mentioned binary signals by eight to fourteen modulation (EFM), for example, to produce 8-bit-per-symbol data.

A buffer circuit 8 is constituted by a memory for storing one track of reproduced data and transiently storing the reproduced data from the demodulation circuit 7 as will be explained subsequently.

An error correction circuit 9 is a so-called CIRC (cross interleave Reed-Solomon code) decoding circuit, and functions to correct errors in the reproduced data stored in the buffer circuit 8 to reproduce data of a music program per se, which are outputted at a terminal 10 by means of the buffer circuit 8 at a prescribed data transfer rate.

When causing track jumping of the optical head 3, a system controller 13 calculates, from subcoding address data demodulated by the demodulating circuit 7, the current track position and the number of tracks to the jumping destination, and transmits control signals to a thread servo control circuit 11C of the servo control circuit 11.

The thread servo control circuit 11C is responsive to control signals from the system controller 13 to turn off the servo to shift the optical head 3 along the track radius.

A disturbance detection circuit 14 detects that each servo control from the servo control circuit 11 is turned off, that is, is not in regular operation, due to vibrations or the like, and controls the buffer circuit 8 as will be described subsequently.

The operation is hereinafter explained.

One track of data from the disc 1 are reproduced repeatedly N times at a rate equal to N times a rate of output data transmission at the terminal 10. The reproduced data are demodulated at the demodulating circuit 7 and stored in the buffer circuit 8. Meanwhile, if data cannot be reproduced correctly during data reproduction, due to, for example, vibrations from outside, that is, if the disturbance detection circuit 14 detects that the servo is not in good order, data storage in the buffer circuit 8 is discontinued. If the disturbance detection circuit 14 detects that the servo control is in good order, the reproduced data are stored in the buffer circuit 8. As a result, data reproduced when the servo control is out of order are discarded, while data reproduced when the servo control is in good order are stored in the buffer circuit 8, for forming one track of data.

In this manner, with the present embodiment, one track of data recorded on the disc-shaped recording medium is repeatedly reproduced due to the rotational velocity of the disc being equal to N times the prescribed rotational velocity, and one track of data is formed from the reproduced N-number of data to enable data reproduction which compensates for disturbances, such as vibrations.

On the other hand, by data processing in which data reproduced while servo control is not, in regular operation are discarded, data reproduction may be made in a manner which compensate for disturbances, such as vibrations.

In addition, by storing data reproduced while servo control is in regular operation in the above described buffer circuit 8 adapted for storing one track of data, and by forming one track of data, data reproduction can be compensated for disturbances, such as vibrations.

Meanwhile, the buffer circuit 8, which is constituted by a memory adapted to store one track of data in the above described embodiment, may also be constituted by a memory adapted for storing playback data for N tracks.

Figure 2:
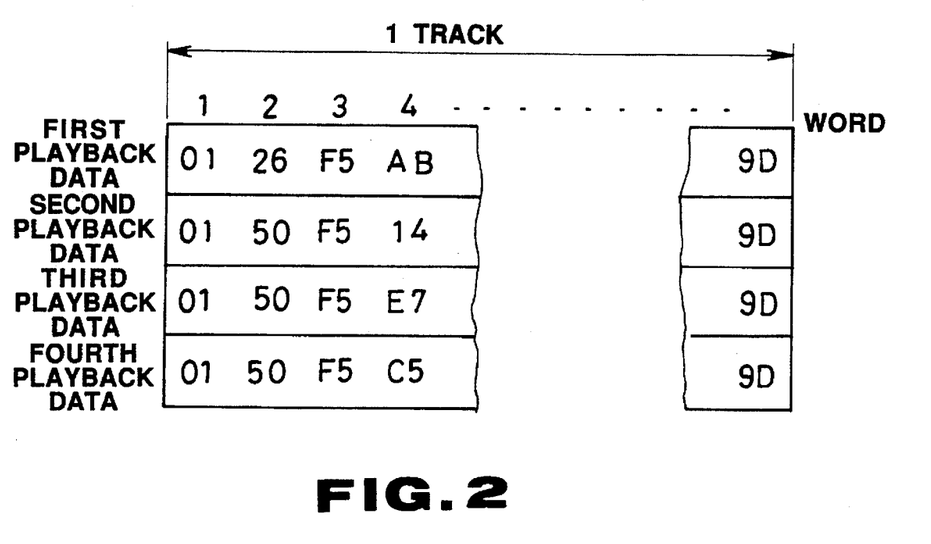
FIG. 2 is a diagrammatic view showing data stored in a buffer circuit of the optical disc reproducing apparatus.

That is, as shown for example in FIG. 2, the disc 1 is rotationally driven at a rotational velocity equal to four times the data output transfer rate in order to reproduce one track of data four times repeatedly, and the data reproduced by each reproducing operation are directly stored in the buffer circuit 8. One track of data are formed by taking the majority of the data reproduced four times, as an example. Note specifically, when the second word is reproduced as "26" in hexadecimal notation at the time of the first reproducing operation, and as "50" in hexadecimal notation at the time of the second and the following reproducing operations, "50" is selected as the correct reproduced data in hexadecimal notation. If the reproduced data differ for each time of reproduction, as in the case of the fourth word, the data are not used but are handled as erroneous data.

In this manner, by directly storing data obtained by the N times of reproduction in the buffer circuit 8 and taking the majority of the stored data to form one track of data, data error occurrences may be reduced and data reproduction more invulnerable to disturbances, such as vibrations, may be achieved. The majority taking of the stored data may be made after the error correction. If the number N is not an integer, that is, if the data reproducing rate from the disc-shaped recording medium is not an integer times the data transfer rate, the buffer circuit 8 is designed to store data of a number of tracks which is a minimum integer larger than N so that data stored during the last reproducing operation are stored partially in the one-track memory.

The present invention is not limited to the above described embodiment and may be applied to, for example, a so-called CD-ROH, a once-write type optical disc apparatus, an overwrite type magneto-optical disc apparatus, or to a magnetic disc apparatus. The present invention may also be applied to a disc recording/reproducing apparatus which makes use of a disc-shaped recording medium rotated at a constant angular velocity (CAV). The buffer circuit 8 may also be provided upstream of the demodulating circuit 7.

According to the present invention, as explained hereinafter, by repeatedly reproducing one track of data recorded on the disc-shaped recording medium N times using a rotational velocity of the disc which is N times a prescribed velocity, and by forming one track of data from the N-number of the reproduced data, regular data reproduction may be achieved even under an operating environment where more or less severe vibrations occur, such as in the case of car-laden apparatus.

In addition, according to the present invention, data errors may be reduced by processing the N-number of reproduced data to form one track data.

For example, data reproduced when servo control is in normal operation may be stored in a data buffer adapted to store one track data to produce error-free one track data.

Also by directly storing data obtained by the N-number reproducing operations in the data buffer, the majority of the stored data may be taken to form one track of data for further reducing data errors.

In other words, data reproduction may be achieved with a higher reliability even under an operating environment subjected to more or less severe vibrations.

By referring to the drawings, an embodiment of the magneto-optical disc recording/reproducing apparatus according to the present invention will hereinafter be explained.

Figure 3:
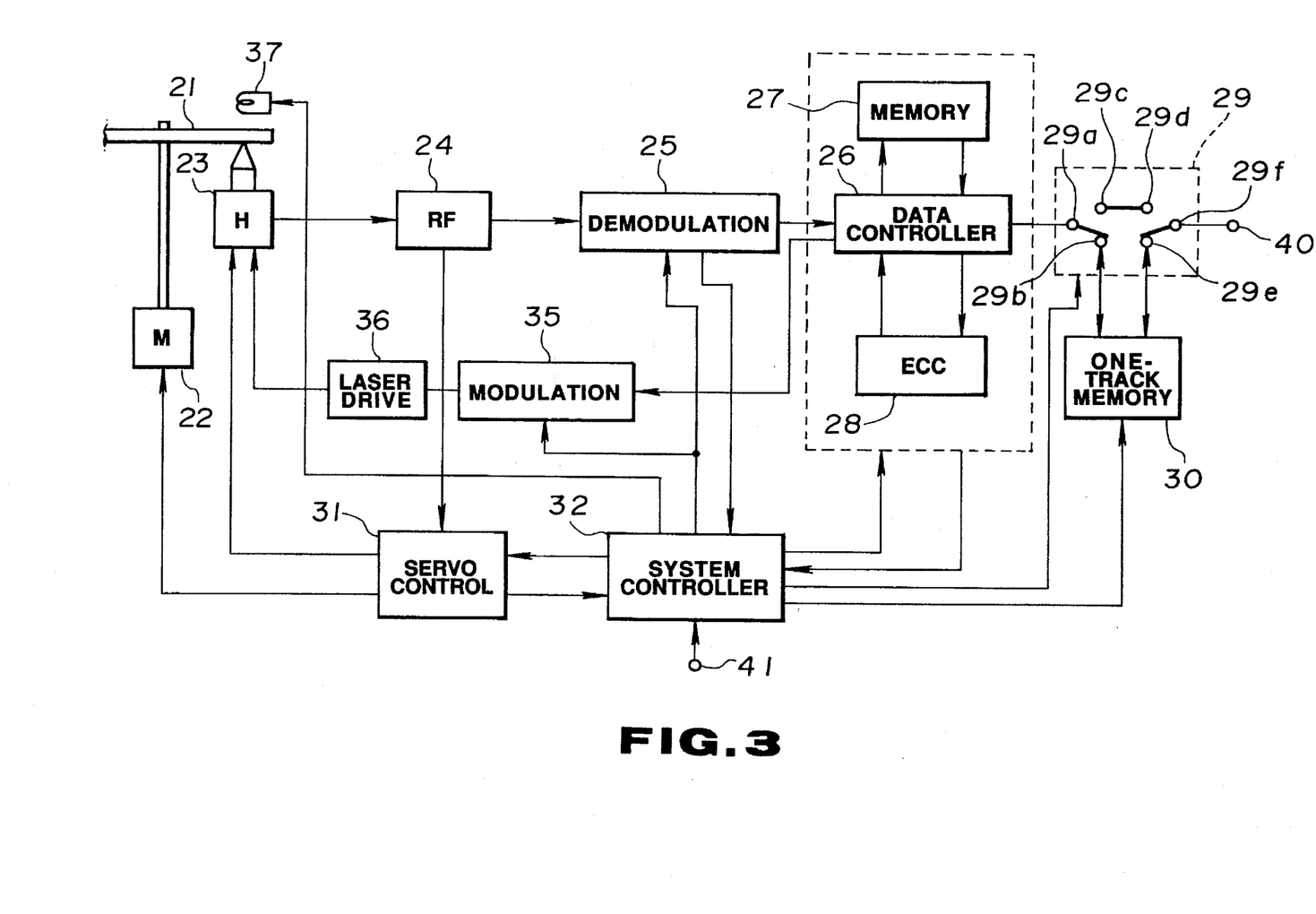
FIG. 3 is a block circuit diagram showing the construction of a magneto-optical disc recording/reproducing apparatus embodying the present invention.

FIG. 3 is a block circuit diagram showing an arrangement of a magneto-optical disc recording/reproducing apparatus according to the present invention.

In the magneto-optical disc recording/reproducing apparatus, shown in FIG. 3, a disc 21 is rotationally driven by a spindle motor 22 at a constant linear velocity (CLV) or a constant angular velocity (CAV) which is N times the rotational velocity of the disc which would normally be used for transfer rate of input data entered at a terminal 40 or of reproduced data outputted at the terminal 40, for example, N times the data transfer rate prescribed by the position of the terminal 40.

The disc 21 is a magneto-optical disc for data recording and reproduction which is provided with recording track(s) formed by spiral or concentric grooves or lands defined between the grooves. A variety of data are recorded on the recording track in accordance with a predetermined modulation by so-called thermomagnetic recording. These recorded data may be reproduced. That is, on the track, there are alternately recorded along the track synchronization signals, address data and data per se in accordance with a predetermined format. Synchronization may be achieved during data recording and reproduction by these synchronization signals, whereas data supervision may be made by address data. Various data per se, such as data of a music or video program, are adapted to be recorded in the data recording area along with error correction code (ECC) and data transfer rate information associated with the kind of data to be recorded.

An optical head 23 is constituted by a laser light source, such as a laser diode, optical components, such as a collimator lens, object lens, polarization beam splitter or a cylindrical lens, and split photodetectors. When recording data on the disc 21, a laser beam from the laser light source is pulse-modulated in accordance with record data by a laser driving circuit 36 under the magnetic field produced by a coil 37 before being irradiated on the recording surface of a target track of the disc 21 for recording data by thermomagnetic recording. When reproducing data from the disc 21, the laser beam is irradiated on the recording surface of the target track of the disc 21 and, in cooperation with an RF circuit 24 of a matrix configuration, the optical head detects the differential polarization angle (Kerr rotation angle) of the reflected light from the recording surface to produce playback signals. The optical head also detects focusing error signals by the so-called astigmatic method, while detecting tracking error signals by the so-called push-pull method.

The above mentioned RF circuit 24 renders the reproduced signals into binary signals and transmits the binary signals to a demodulating circuit 25. The circuit 24 also transmits the focusing error signals and the tracking error signals to a servo control circuit 31.

The demodulating circuit 25 is constituted by, for example, a clock reproducing circuit, a synchronization circuit and a demodulator (not shown). The clock reproducing circuit of the demodulating circuit 25 reproduces clock signals recorded on the disc 21 from the binary signals. The synchronization detection circuit detects synchronization signals from the binary signals, with the aid of the clock signals from the clock reproducing circuit, for synchronization, while assuring synchronization protection to prevent desynchronization is case synchronization signals cannot be detected under the effects of dropout of jitter. The demodulator demodulates the binary signals in accordance with a predetermined demodulation system for conversion into, for example, 8-bit-per-symbol reproduced data, while detecting the data transfer rate information recorded on the disc 21 along with data per se. The demodulating circuit 25 supplies the reproduced data to a data controller 26, while supplying the information necessary for system control, such as the above mentioned clock signals, synchronization signals or data transmitting rate information, to the system controller 32.

The data controller 26 controls a memory 27 and an error correction circuit 28, under control of the system controller 32, in such a manner that, during data reproduction, the reproduced data from the demodulating circuit 25 are stored transiently in the memory 27 and error correction is made of the reproduced data transiently stored in the memory 27. The data controller 26 supplies the error-corrected reproduced data to a switching circuit 29. The data controller 26 also controls the memory and the error correction circuit 28, in such a manner that, during data recording, input, data supplied by means of the switching circuit 29 are transiently stored in the memory 27 and error correction code is added at the error correction circuit 28 to the input data transiently stored in the memory 27. The data controller 26 transmits the input data added to by the error correction code to a demodulation circuit 35. For checking that the input data have been correctly recorded on the disc 21 the data controller 26 compares the input data stored in the memory 27 with the reproduced data from the demodulating circuits 25 to supply the results of comparison to the system controller 32.

The switching circuits 29 operates under control of the system controller 32 to make a switching during data reproduction between outputting the reproduced data from the data controller 26 directly to the terminal 40 and outputting the data to the terminal by the interposition of a one track memory 30 and a switching during data recording between directly supplying input data supplied by means of the terminal 40 to the data controller 26 and supplying the data to the data controller 26 by the interposition of the one track memory 30. During data reproduction, the one track of memory 30 transiently stores error-corrected one track reproduced data from the data controller 26 and, at the time point, when the optical head 23 starts to be shifted to the next track, outputs the stored reproduced data at a prescribed data transfer rate by way of the switching circuit 29 and the terminal 40.

During data recording, the one-track memory 30 stores input data continuously supplied thereto through the switching circuit 29 and, at the time point when the one track of input data have been stored, transmits the stored one track of input data to the data controller 26 by way of the switching circuit 29. More specifically, the one-track memory 30 is constituted by a first memory and a second memory, each having a one-track capacity. During data reproduction, the memory 30 stores in the first memory data reproduced while the optical head 23 scans the same track, while outputting data stored in the second memory, with the optical head 23 scanning the preceding track at the prescribed data transfer rate at the terminal 40 as the playback data. By alternately using the first memory and the second memory in this manner, the reproduced data outputted from the one-track memory 30 through the terminal 40 become continuous data. During data recording, while one track of data of the continuously supplied input data are stored in the first memory, one track of input data stored in the second memory are supplied to the data controller 26. On the other hand, while one track of input data are stored in the second memory, one track of input data stored in the first memory are supplied to the data controller 26. By alternately using the first and second memories in this manner, continuous input data supplied at the terminal 40 may be supplied without data dropout to the data controller 26 by means of the switching circuit 29.

The modulating circuit 35 modulates the input data to which is added the error correction code from data control let 26 in a predetermined manner with the use of clock signals from system controller 32, while adding the data transfer rate information from the system control let 32 to the modulated data to form record data having a transfer rate which is N times the transfer rate of the input data to supply the resulting record data to the laser driving circuit 36.

As mentioned hereinabove, the laser driving circuit 36 pulse modulates the laser light source of the optical head 23 on the basis of the record data under the magnetic field generated by the coil 37. As a result, data are recorded on the track of the disc 21.

The servo control circuit 31 is mainly constituted by a focusing servo circuit, a tracking servo control circuit, a spindle motor servo control circuit and a thread servo control circuit all of which are not shown. That is, the focusing servo control circuit actuates the object lens of the optical head 23 along the optical axis so that the focusing error signal from the optical head 24 will be zero. The tracking servo control circuit actuates the object lens of the optical head 23 so that the tracking error signal from the RF circuit 24 will be zero. The spindle motor servo control circuit controls the spindle motor 22 so that the PLL of the demodulating circuit 25 will be locked. The thread servo control circuit is responsive to control signals from the system controller 32 to shift the optical head 23 along the disc radius. the servo control circuit 31 , constructed in this manner, transmits the information indicating the operating states of various parts controlled by the servo control circuit 31 to the system controller 32.

The system controller 32 controls the demodulating circuit 25, data controller 26, memory 27, error correction circuit 28, switching circuit 29, one-track memory 30, servo control circuit 31, modulating circuit 35 and the coil 37, as described hereinabove, with the aid of the information showing the operating states of various parts from the servo control circuit 31, the information necessary for system control from the demodulating circuit 25 and the data transfer rate information supplied by means of, for example, the terminal 41.

Thus, in the present embodiment, during data recording, driving means rotationally driving the disc 21 at the rotational velocity equal to N times the rotational velocity of the disc corresponding to the transfer rate of the input data during data recording, is constituted by the spindle motor 22, RF circuit 24 and the servo control circuit 31, the optical head 23 is used as the recording head for scanning the track of the disc 21 for recording data, the one-track memory 30 is used as storage means for storing continuously supplied track of input data, record data forming means for converting data read out from the one track memory 30 into record data having the transfer rate which is N times the above mentioned transfer rate is constituted by the data controller 26, memory 27, error correction circuit 28, modulation circuit 35 and the laser driving circuit 36, and the system controller 32 is used as control means operating in such a manner that one track of data stored in the one-track memory 30 are written in the target track as the record data having an N-fold transfer rate during the time interval when the next one track of input data are stored in the one-track memory and, after the lapse of the time interval, the one track of data stored in the one track memory 30 during the time interval are recorded in the next target track.

On the other hand, during data reproduction, driving means rotationally driving the disc 21 at a rotational velocity equal to N times the rotational velocity of the disc corresponding to the transfer rate of the reproduced data is constituted by the spindle motor 22, RF circuit 24 and the servo control circuit 31, the optical head 23 is used as the reproducing head for scanning the track on the disc 21 for reproducing continuously recorded data, data reproducing means for reproducing reproduced data from the reproduced signals from the optical head 23 is constituted by the RF circuit 24-error correction circuit 28, the one-track memory 30 is used as storage means for storing one track of playback data from data reproducing means and for continuously outputting the stored reproduced data at the above mentioned transfer rate, and the system controller 32 is used as control means operating in such a manner that the optical head 23 scans the same track during the time interval necessary for the disc 21 to perform N-number of revolutions and, after lapse of the time interval, the optical head 23 starts reproducing the next track.

Figure 4:
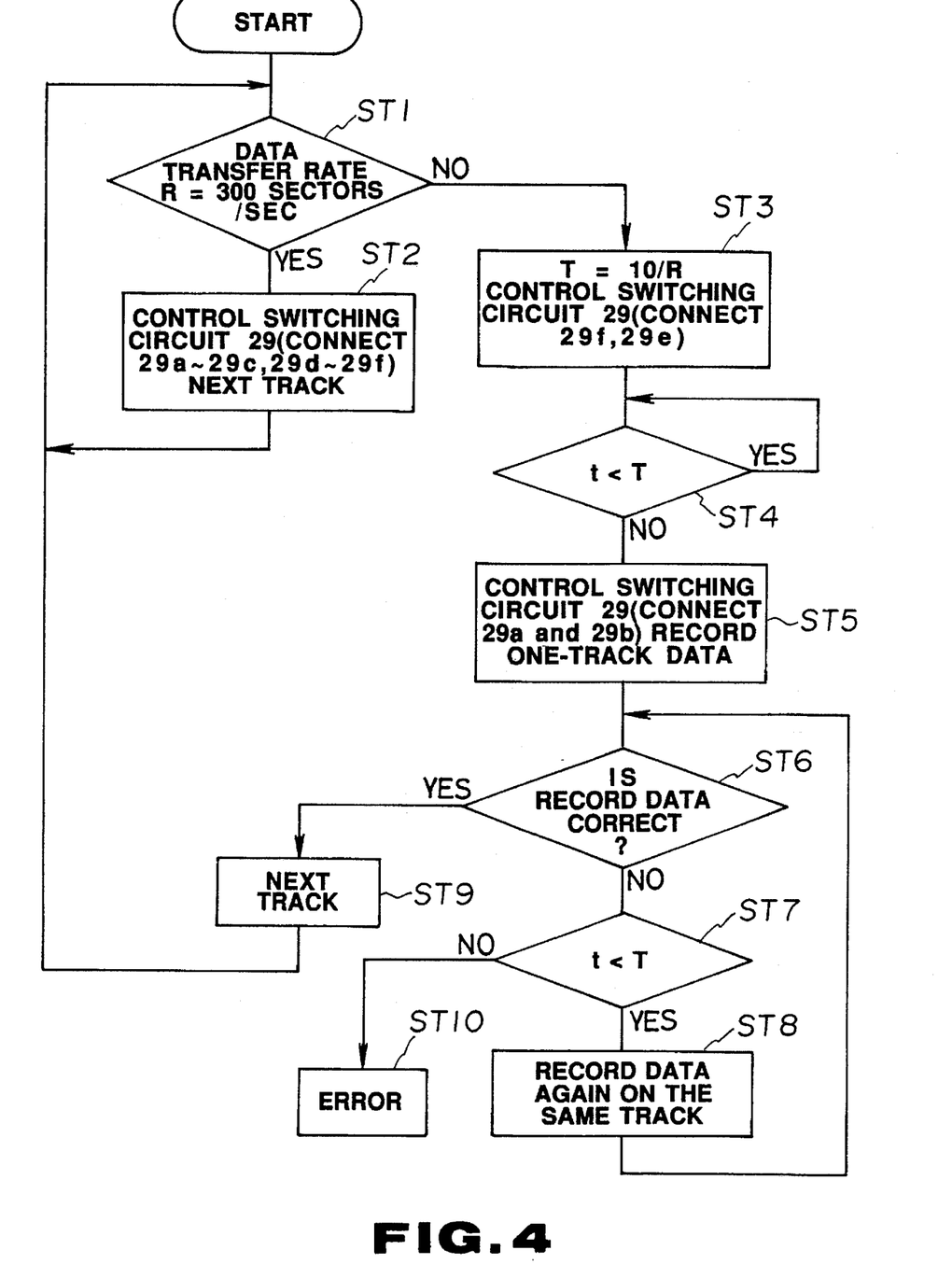
FIG. 4 is a flow chart showing a data recording operation of the magneto-optical disc recording/reproducing apparatus.

The operation of recording data on the disc 21 by the above described magneto-optical disc recording and/or reproducing apparatus is explained by referring to the flow chart shown in FIG. 4.

It is assumed that the disc 21 is rotated at the rotational velocity of 1800 rpm, each track of the disc 21 is constituted by 10 sectors (10 sectors/track), each sector is constituted by 98 segments (98 segments/sector) and that the data volume in each segment that may be used by the user is 24 bytes. That is, the time (period) of one full revolution of the disc 21 is 33{1÷(1800÷60)×100} ms, whereas the maximum data transfer rate through terminal 40 is 300(1800÷60×10) sectors/second. On the other hand, the transfer rate of input data supplied through the terminal 40 is prescribed by the data type and, with the rate of R sectors/second, the time T necessary for inputting one track (ten sector) data is 10÷R.

It is also assumed that the input data supplied by means of terminal 40 are data of the B level stereo mode data which are the CD-DA mode data in the so-called CD-I (CD-Interactive media) compressed by ¼. Meanwhile, the above mentioned prescribed data transfer rate R of the B level stereo mode data is 18.75 sectors/second. Thus the time T necessary to enter one track of input data by means of terminal 40 is 533 (10÷18.75×1000) ms. In other words, the disc 21 performs 16 (300÷18.75) revolutions during the time in which one track of input data are entered by means of the terminal 40.

At step ST1 of the flow chart shown in FIG. 4, the system controller 32 checks the data transfer rate information R supplied by means of terminal 40. If the data transfer rate R corresponds to the above mentioned maximum data transfer rate of 300 sectors/second, the system control let 32 proceeds to step ST2 and, otherwise, the system controller proceeds to step ST3. In the present example in which the input data are the B level stereo mode data, since the data transfer rate R is 18.75 sectors/second, the system controller proceeds to step ST3.

At step ST2, the system controller 32 interconnects contacts 29a–29c and contacts 29d–29f of the switching circuit 29, while shifting the optical head 23 to the next track each time the disc 21 makes one complete revolution. As a result, the input data entered at the terminal 40 for each revolution of the disc 21 at the data transfer rate of 300 sectors/second are modulated in a predetermined manner before being sequentially recorded on the disc 21.

At step ST3, the system controller 32 calculates the time T necessary to store one track of input data in the one-track memory 30 (T=10÷R, referred to hereinafter as buffer time) and interconnects contacts 29f–29e of the switching circuit 29, before proceeding to step ST4. In the present B level stereo mode, the buffer time T is 533 ms.

At step ST4, the system controller 32 compares the time t elapsed since the time of starting storage of the one track of input data in the one-track memory 30 to the buffer time T. If the time elapsed t is short, the controller repeats the step ST4 and, when the time elapsed t becomes equal to the buffer time T, the controller proceeds to step ST5. That is, the step ST4 is repeated as a loop until one track of input data are stored in e.g. the first memory of the one-track memory 30. Meanwhile, for sequentially recording the continuously supplied input data on the disc 21 without dropout, data storage in the second memory is started as soon as data storage in the first memory of the one-track memory in terminated.

AT step ST5, the system controller 32 interconnects contacts 29a–29b of the switching circuit 29. As a result, one-track input data stored in the first memory of the one track of memory 30 are stored in the memory 27 by means of the switching circuit 29 and the data controller 26. The recording data, to which error correction data and data transfer rate data R have been annexed and which have been modulated in a predetermined manner, are recorded on the target track. The system controller 32 then proceeds to step ST6.

At step ST6, the just recorded data are reproduced for determining whether or not the data recorded on the target track at step ST5 are correct. The data control let 26 compares the input data stored in the memory 27 to the reproduced data, as described previously, and transmits the results of the comparison to the system controller 32. The system controller 32 proceeds to step ST9 if the data are recorded correctly, and to step ST7 if otherwise.

At step ST9, the system controller 32 shifts the optical head 23 to the next track, because data recording has been made correctly. The system controller then reverts to step ST1.

On the other hand, at step ST7, the system control let 32 compares the time t elapsed since the time of starting of storage of input data in the second memory of the one-track memory 30 to the buffer time T. The system controller shifts to step ST8 if the time elapsed t is shorter and to step ST10 if the time elapsed t is equal to the buffer time T.

At step ST8, system controller 32 again records data per se and the data transfer rate information on the same track before reverting to step ST6. Thus, in the loop of steps ST6 to ST8, system controller 32 repeatedly performs, during the time of storage of the next input data in the second memory of the one track memory, an operation of ascertaining or verifying of data recording has been made correctly on the current target track.

On the other hand, at step ST10, the system controller 32 makes an error display as a data record error, because data recording has not been made correctly in the target track during the time of storing the next one track of input data in the one track memory 30.

In this manner, by storing one track of input data supplied to the one-track memory 30 at the predetermined data transfer rate R, rotating the disc 21 at a rotational velocity which is N times the rotational velocity corresponding to the data transfer rate R, recording data stored in the one-track memory 30, with the optical head 23 scanning the same track a plural number of times, and by repeating a data recording operation during the time when the next one track of input data are stored in the one-track memory 30 so that data recording may be made correctly on the target track, the input data continuously supplied to the disc 21 may be recorded correctly, provided that the optical head 23 scans the target track correctly at least once, even if the optical head 23 should be off-track due to vibrations OF the like. On the other hand, by converting input data at the demodulating circuit 35 into record data having a transfer rate equal to N times the input data transfer rate, data per se may be recorded continuously on the track of the disc 21.

Figure 5:
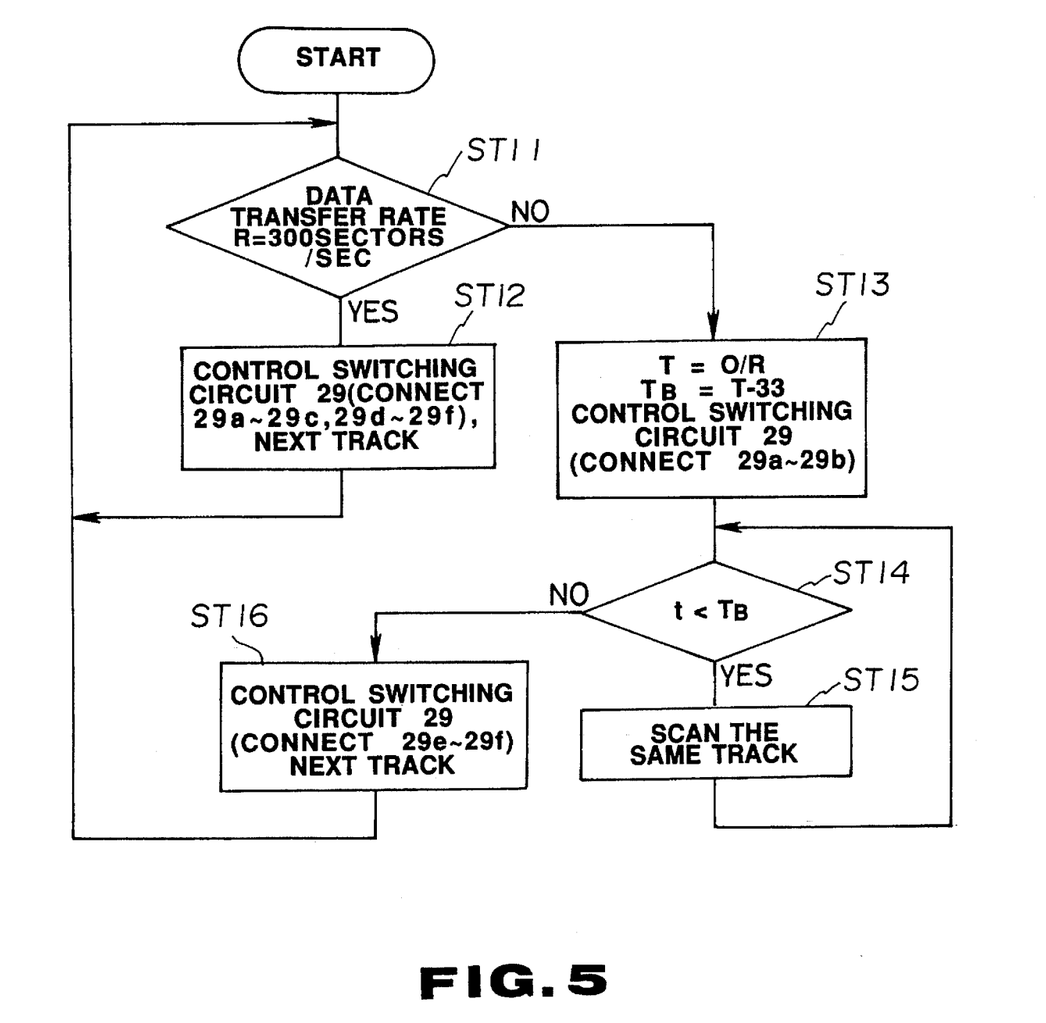
FIG. 5 is a flow chart showing a data reproducing operation of the magneto-optical disc recording/reproducing apparatus.

The operation of reproducing data from the disc 21 by the magneto-optical disc recording and/or reproducing apparatus shown in FIG. 3 is explained by referring to a flow chart of FIG. 5.

As in the case of the above mentioned data recording operation, it is assumed that the rotational velocity of the disc 21 is 1800 rpm, each track of the disc 21 is constituted by 10 sectors (10 sectors/track), each sector is constituted by 98 segments (98 segments/section) and that the data volume in each segment that may be used by the user is 24 bytes. That is, the time (period) of one full revolution of the disc 21 is 33{1÷(1800÷60)×100} ms, whereas the maximum transfer rate for playback data outputted through terminal 40 is 300 (1800÷60×10) sectors/second. On the other hand, the transfer rate of input data supplied through the terminal 40 is prescribed by the data type and, with t-he rate of R sectors/second, the time T necessary for inputting one t-rack (ten sector) data is 10÷R.

It is also assumed that, as in the case of the data recording operation, data recorded on the disc 21 are data of the B level stereo mode data, which are the CD-DA mode data in the so-called CD-I (CD-Interactive media) compressed by 1/c. The above mentioned prescribed data transfer rate R is then 18.75 sectors/second. Thus the time T necessary to output one track of input data by means of terminal 40 is 533 (10÷18.75×1000) ms. In other words, the disc 21 performs 16 (300÷18.75) revolutions during the time in which one track of input data are outputted by means of the terminal 40.

At step ST11 of the flow chart shown in FIG. 5, the system controller 32 checks the data transfer rate information R read out from disc 21. If the data transfer rate R corresponds to the above mentioned maximum data transfer rate of 300 sectors/second, the system controller 32 proceeds to step ST12 and, otherwise, the system controller proceeds to step ST13. In the present example in which the data recorded on the disc 21 are the B level stereo mode data, since the data transfer rate R is 18.75 sectors/second, the system controller proceeds to step ST13.

At step ST12, the system controller 32 interconnects contacts 29a–29c and contacts 29d–29f of the switching circuit 29, while shifting the optical head 23 to the next track each time the disc 21 makes one complete revolution. As a result, playback data reproduced by each complete revolution of the disc 21 are outputted at the terminal 40 at the data transfer rate of 300 sectors/second.

On the other hand, at step ST13, the system controller 32 calculates the time T necessary to transfer one track of data (T=10÷R) and the time $T_B$ equal to the time T less the time necessary to read out one track of data from the disc 21 ($T_B$=T−33 ms; referred to hereinafter as the buffer time), and interconnects contacts 29a and 29b of the switching circuit 29, before proceeding to step ST14. In the present B level stereo mode, the buffer time $T_B$ is 500 (533−33) ms.

At step ST14, the system controller 32 compares the time t elapsed since the start of scanning of the target track to the buffer time $T_B$. If the time elapsed t is less than the buffer time $T_B$, the system controller 32 proceeds to step ST15 and, if the time t is equal to the buffer time $T_B$, the system controller proceeds to step ST16.

At step ST15, the system controller 32 causes the optical head 23 to scan the same track, before reverting to step ST14. That is, if, in the loop of steps ST14 and ST15, the time t less than the buffer time $T_B$, the system controller 32 causes the optical head 23 to scan the same track. The playback data obtained by the optical head 23 scanning the same track are stored in e.g. the first memory of the one-track memory 30.

On the other hand, at step ST16, the system controller 32 interconnects contacts 29e and 29f of the switching circuit 29 for outputting one track of playback data stored in the first memory of the one-track memory 30 at step ST15, at the same time that the controller shifts the optical head 23 to the next track. As a result, one track of playback data stored in the first memory of the one-track memory 30 at step ST15 are outputted at the terminal 40 at the data transfer rate R prescribed by the data types. With the above described B level stereo mode, playback data are outputted at the data transfer rate of 18.75 sectors/second. Meanwhile, the next one track of playback data are stored in the second memory while the playback data stored in the first memory of the one-track memory 30 are outputted. In this manner, the playback data are outputted continuously at the prescribed data transfer rate at the terminal 40.

Meanwhile, when reproducing a music program, for example, it is also possible to proceed to step ST16 directly from step ST13, on starting reproduction, for shortening the so-called access time, that is the tine which elapses since the command for reproduction is issued until the music program actually starts to be reproduced. That is, playback data obtained upon scanning the same track once may be outputted directly.

As described hereinabove, by rotating the disc 21 at a rotational velocity which is N times the rotational velocity of the disc corresponding to the data transfer rate R, reproducing data with the optical head 23 scanning the same track a plural number of times, storing reproduced one track of data in the track memory 30 and outputting the reproduced data from the one-track memory 30 at the predetermined data transfer rate 12, the reproduced correct one track of data are stored in the track memory 30, provided that the optical head 23 correctly scans the target track at least once within the buffer time $T_B$, even though the optical head 23 should be off-track due to vibrations of the like. Thus the reproduced one track of data stored in the one-track memory 30 may be outputted to enable continuous data reproduction.

The present invention is not limited to the above embodiment, but may be applied to, for example, a so-called CD-ROM, once-write type optical disc apparatus of magnetic disc apparatus. The present invention may also be applied to a disc recording/reproducing apparatus employing a disc-shaped recording medium rotating at a constant linear velocity (CLV).

With the above described disc recording apparatus according to the present invention, by storing one track of input data, continuously supplied at a prescribed data transfer rate, in memory means, rotating the disc-shaped recording medium at a rotational velocity which is N times the rotational velocity of the recording medium corresponding to the transfer rate of the input data, causing the recording head to scan the target track a plural number of times during the time when the next one track of input data are stored in the memory means, and by repeating the data recording operation so as to correctly record the one track of input data stored in the memory means, the continuously supplied input data may be recorded correctly, even if the recording head should be off-track during its operation. Also, by converting the input data by recording data forming means into recording data having a transfer rate which is N time the transfer rate of the input data, data may be recorded continuously on the track of the disc-shaped recording medium. Above all, data recording may be achieved in regular order even under operating environments subject to more or less severe vibrations, such as in car-laden apparatus.

Also, with the disc reproducing apparatus of the present invention, by rotating the disc-shaped recording medium at a rotational velocity equal to N times the rotational velocity corresponding to the transfer rate of playback data, reproducing the data with the reproducing head scanning the same track for a time interval necessary for the disc-shaped recording medium to perform an N number of revolutions, storing the one track of playback data in memory means, and by outputting the stored playback data at the prescribed data transfer rate, the correct data many be reproduced from the disc-shaped recording medium, even if the reproducing head should be off-track during its operation, because the data reproduction is performed with the reproducing head scanning the same track a plural number of times. In addition, continuous data reproduction may be achieved because one track of playback data are stored once in memory means and playback data are outputted from the memory means at the prescribed data transfer rate, without directly outputting the playback data read out from the disc-shaped recording medium. Above all, data reproduction may be made in a regular manner even under operating environments subject to more or less severe vibrations, such as in the car-laden apparatus.

What is claimed is:

1. A data reproducing method for reproducing data by scanning a disc-shaped recording medium by a reproducing head, said method comprising the steps of:

rotationally driving said disc-shaped recording medium at a velocity equal to N times a rotational velocity of the recording medium corresponding to a transfer rate of data recorded on said disc-shaped recording medium, N being a real number larger than unity, scanning a same position on said disc-shaped recording medium M times, where M is an integer (N≧M>1), by said reproducing head for reading out data of a predetermined volume M times and writing said data in a memory, detecting an occurrence of a disturbance in the scanning of said disc-shaped recording medium by said reproducing head, terminating data writing in said memory as a function of detection of said disturbance and forming uncorrupted data of said predetermined volume from data stored in said memory, and sending out the uncorrupted data at a predetermined data transfer rate.

2. The data reproducing method according to claim 1 wherein detection of said disturbance is performed by focusing error signal or tracking error signal.

3. The data reproducing method according to claim 1 wherein said data of the predetermined volume is one track of data of said disc-shaped recording medium.

4. The data reproducing method according to claim 1 wherein said N is an integer.

5. The data reproducing method according to claim 4 wherein said M is equal to said N.

6. A data reproducing method for reproducing data by scanning a disc-shaped recording medium by a reproducing head, said method comprising the steps of:

rotationally driving said disc-shaped recording medium at a velocity equal to N times a rotational velocity of the recording medium corresponding to a transfer rate of data recorded on said disc-shaped recording medium, N being a real number larger than unity, scanning a same position on said disc-shaped recording medium M times, where M is an integer (N≧M>1), by said reproducing head for reading out data of a predetermined volume M times and writing said data in a memory, terminating data writing in said memory as soon as said data of the predetermined volume are stored in said memory, sending out data at a predetermined data transfer rate.

7. The data reproducing method according to claim 6 wherein said N is an integer.

8. A data reproducing method for reproducing data by scanning a disc-shaped recording medium by a reproducing head, said method comprising the steps of:

rotationally driving said disc-shaped recording medium at a velocity equal to N times a rotational velocity of the recording medium corresponding to a transfer rate of data recorded on said disc-shaped recording medium, N being a real number larger than unity, scanning a same position on said disc-shaped recording medium M times, where M is an integer (N≧M>1), by said reproducing head for reading out data of a predetermined volume M times and writing said data in a memory, forming uncorrupted data of the predetermined volume by a majority operation on the data of the predetermined volume of M times of scanning stored in said memory, sending out the uncorrupted data at a predetermined data transfer rate.

9. The data reproducing method according to claim 8 wherein said majority operation is effected after performing an error correcting operation of data read out from said disc-shaped recording medium.

10. The data reproducing method according to claim 8 wherein said data of the predetermined volume is one track of data of said disc-shaped recording medium.

11. A data reproducing method for reproducing data by scanning a disc-shaped recording medium by a reproducing head, said method comprising the steps of:

rotationally driving said disc-shaped recording medium at a velocity equal to N times a rotational velocity of the recording medium corresponding to a transfer rate of data recorded on said disc-shaped recording medium, N being a real number larger than unity, scanning a same position on said disc-shaped recording medium M times, where M is an integer (N≧M>1), by said reproducing head for reading out data of a predetermined volume M times and writing said data in a memory, forming uncorrupted data of said predetermined volume after at least a signal operation including an error correcting operation to data stored in said memory at a velocity more than N times a transfer velocity of the data recorded in said disc-shaped recording medium, sending out data at a predetermined data transfer rate.

12. The data reproducing method according to claim 11 wherein said data of the predetermined volume is one track of data of said disc-shaped recording medium.

13. The data reproducing method according to claim 11 wherein the predetermined data transfer rate corresponds to a transfer rate of data recorded on said disc-shaped recording medium.

14. The data reproducing method according to claim 11 wherein said N is an integer.

15. The data reproducing method according to claim 14 wherein said M is equal to said N.

16. A data reproducing apparatus for reproducing data recorded on a disc-shaped recording medium comprising driving means for rotationally driving said disc-shaped recording medium at a velocity equal to N times a rotational velocity of the recording medium corresponding to a transfer rate of reproduced data, N being a real number larger than unity, a reproducing head for scanning a same position on said disc-shaped recording medium M (N≧M>1) times for reading out data of a predetermined volume by M times, where M is an integer, data forming means for forming uncorrupted playback data of the predetermined volume from data read out M times by said reproducing head, storage means for storing the playback data of the predetermined volume formed by said data forming means and continuously outputting said playback data at said transfer rate, and control means for controlling a scanning position of said reproducing head so that said reproducing head will scan a same position on said disc-shaped recording medium for a time interval necessary to read out the data of the predetermined recording medium M times and so that said reproducing head will start reading out succeeding data after the lapse of said time interval.

17. The data reproducing apparatus according to claim 16 wherein said storage means include a first memory and a second memory each having a storage capacity to store the playback data of said predetermined volume, and wherein the playback data of the predetermined volume formed by said data forming means are alternately stored in said first and second memories.

18. The data reproducing apparatus according to claim 16 comprising switch means for selectively outputting the data read out by scanning the same position on said disc-shaped recording medium only once without being stored in said storage means and for selectively causing the data read out by scanning said M times to be stored in said storage means so as to be reproduced at said transfer rate of the playback data.

19. The data reproducing apparatus according to claim 18 wherein said control means, when said reproducing head seeks a playback start position on said disc-shaped recording medium, causes said data read out from said disc-shaped recording medium to be reproduced without being stored in said storage means.

20. The data reproducing method according to claim 16 wherein the data of the predetermined volume is one track of data on said disc-shaped recording medium.

21. A data recording method for recording continuously inputted data received at a predetermined transfer rate on a disc-shaped recording medium by scanning said recording medium by a recording head, comprising the steps of:

rotationally driving said disc-shaped recording medium at a velocity equal to N times a rotational velocity of the recording medium corresponding to said data transfer rate of said input data, N being a real number larger than unity, writing said continuously inputted input data in a memory having a storage capacity not less than a predetermined volume, converting data of said predetermined volume stored in said memory into record data having a data transfer rate equal to N times said data transfer rate of said input data during the time of writing data of a next predetermined volume in said memory, and recording said record data on said disc-shaped recording medium.

22. The data recording method according to claim 21 wherein, during the time of writing data of a next predetermined volume in said memory, data of the predetermined volume recorded on the disc-shaped recording medium are reproduced and compared with said record data stored in said memory to confirm if said data were properly recorded on the disc-shaped recording medium.

23. The data recording method according to claim 22 wherein, if a recording error is detected, the record data stored in said memory are re-recorded at a same recording position on said disc-shaped recording medium.

24. The data recording method according to claim 21 wherein the data of the predetermined volume is one track of data on said disc-shaped recording medium.

25. A data recording apparatus wherein continuously inputted input data received at a predetermined transfer rate are recorded on a disc-shaped recording medium comprising driving means for rotationally driving said disc-shaped recording medium at a velocity equal to N times a rotational velocity of the recording medium corresponding to said data transfer rate of said input data, a recording head for scanning said disc-shaped recording medium for recording data thereon, storage means for writing said input data in a volume not less than a predetermined volume, data forming means for converting the data of the predetermined volume in said storage means into record data having a data transfer rate equal to N times said data transfer rate of said input data, and for supplying resulting data to said recording head, and control means for controlling recording of the data of the predetermined volume stored in the storage means on said disc-shaped recording medium during the time of writing data of a next predetermined volume in said storage means.

26. The data recording apparatus according to claim 25 wherein said storage means comprises a first memory and a second memory each having a storage capacity of the input of the predetermined volume, and wherein the input data of the predetermined volume are alternately stored in said first memory and said second memory.

27. The data recording apparatus according to claim 26 further comprising comparator means for reproducing data recorded on said disc-shaped recording medium during a time period which elapses between when data stored in one memory of the memories of said storage means is recorded on said disc-shaped recording medium and the next data stored in the other memory is recorded on said disc-shaped recording medium, and for determining if the reproduced data is the same as the data stored in said one memory.

28. The data recording apparatus according to claim 27 wherein the comparator means, upon detecting that said data recorded on said disc-shaped recording medium is not the same as said data stored in said one memory, causes the recording head to re-record the data recorded in said one memory of said storage means at a same recording position on said disc-shaped recording medium.

29. The data recording apparatus according to claim 25 comprising selection means for writing the input data in said storage means and selecting the data transfer rate.

30. The data recording apparatus according to claim 25 wherein said control means controls a scanning position of said recording head so that input data of the predetermined volume stored in said storage means are recorded on said disc-shaped recording medium during the time of writing a predetermined volume of the next input data in said storage means and, after a lapse of said time, the next input data of the predetermined volume stored in said storage means are recorded at a next record target position on said disc-shaped recording medium.

31. The data recording apparatus according to claim 25 wherein the data of the predetermined volume is one track of data on said disc-shaped recording medium.

32. A data reproducing method for reproducing data by scanning a disc-shaped recording medium by a reproducing head and outputting the reproduced data at a predetermined data transfer rate, the method comprising the steps of:

rotationally driving the disc-shaped recording medium at a velocity equal to N times a conventional velocity for the recording medium when reproducing and outputting data at the predetermined data transfer rate, N being a real integer larger than unity, successively scanning a same position on the disc-shaped recording medium M times, where M is an integer (N≧M>1), with a reproducing head to thereby reproduce M predetermined volumes of the same data and writing one or more of the M volumes of the data in a memory, and detecting an occurrence of a disturbance in the scanning of the disc-shaped recording medium by the reproducing head, interrupting data writing in the memory as a function of the detection of the disturbance and outputting from the memory at the predetermined data transfer rate as uncorrupted data one predetermined volume of data which was written into the memory during a period when no disturbance was detected.

33. The data reproducing method according to claim 32 wherein detection of the disturbance is performed optically.

34. The data reproducing method according to claim 32 wherein the data of the predetermined volume is one track of data of the disc-shaped recording medium.

35. The data reproducing method according to claim 32 wherein the N is an integer.

36. The data reproducing method according to claim 35 wherein the M is equal to the N.

37. A data reproducing method for reproducing data by scanning a disc-shaped recording medium by a reproducing head and outputting the reproduced data at a predetermined data transfer rate, the method comprising the steps of:

rotationally driving the disc-shaped recording medium at a velocity equal to N times a conventional velocity for the recording medium when reproducing and outputting data at the predetermined data transfer rate, N being a real integer larger than unity, successively scanning a same position on the disc-shaped recording medium M times, where M is an integer (N≧M>1), with a reproducing head to thereby reproduce M predetermined volumes of the same data and writing the M volumes of the data in a memory, comparing corresponding data in each predetermined volume in the memory to determine if a majority of the corresponding data in each predetermined volume are in agreement with the corresponding data in the other predetermined volumes and, if so, outputting from the memory at the predetermined data transfer rate as uncorrupted data one predetermined volume of data corresponding to the majority of the data in the predetermined volumes.

38. The data reproducing method according to claim 37 wherein the majority operation is effected after performing an error correcting operation of data read out from the disc-shaped recording medium.

39. A data recording method for recording continuously inputted data received at a predetermined transfer rate on a disc-shaped recording medium by scanning the recording medium by a recording head, comprising the steps of:

rotationally driving the disc-shaped recording medium at a velocity equal to N times a predetermined rotational velocity of the recording medium conventionally used for the data transfer rate of the input data, N being a real number larger than unity, writing the continuously inputted input data in a memory having a storage capacity not less than a predetermined volume, reading out data of the predetermined volume from the memory as record data at a data transfer rate equal to N times the data transfer rate of the input data during a time required for writing data of a next predetermined volume in the memory, and recording the record data on the disc-shaped recording medium.

40. The data recording method according to claim 39 wherein, during the time of writing data of a next predetermined volume in the memory, data of the predetermined volume recorded on the disc-shaped recording medium are reproduced and compared with the data stored in the memory to confirm if they are the same and thereby determine if the data were properly recorded on the disc-shaped recording medium.

41. The data recording method according to claim 40 wherein, if a recording error is detected, the record data stored in the memory are re-recorded at a same recording position on the disc-shaped recording medium.

42. The data recording method according to claim 39 wherein the data of the predetermined volume is one track of data on the disc-shaped recording medium.

43. A data recording apparatus wherein continuously inputted input data received at a predetermined transfer rate are recorded on a disc-shaped recording medium comprising driving means for rotationally driving the disc-shaped recording medium at a velocity equal to N times a predetermined rotational velocity of the recording medium conventionally used for the data transfer rate of the input data, N being a real number larger than unity, a recording head for scanning the disc-shaped recording medium to record data thereon, storage means for storing successive predetermined volumes, one at a time, of input data, modulation means for reading out and converting each predetermined volume of input data in the storage means into record data at a data transfer rate equal to N times the data transfer rate of the input data, and for supplying the record data to the recording head to be recorded on the disc-shaped recording medium, and control means for controlling recording of the record data so that the recording of each predetermined volume of data occurs entirely during the time of writing data of a next predetermined volume in the storage means.

44. The data recording apparatus according to claim 43 wherein the storage means comprises a first memory and a second memory each having a storage capacity of the predetermined volume, and wherein the input data of the successive predetermined volumes are alternately stored in the first memory and the second memory.

45. The data recording apparatus according to claim 44 further comprising comparator means for reproducing data recorded on the disc-shaped recording medium during a time period which elapses between when data stored in one of the memories is recorded on the disc-shaped recording medium and the next data stored in the other memory is recorded on the disc-shaped recording medium, and for determining if the reproduced data is the same as the data stored in the one memory.

46. The data recording apparatus according to claim 45 wherein the comparator means, upon detecting that the data recorded on the disc-shaped recording medium is not the same as the data stored in the one memory, causes the recording head to re-record the data recorded in the one memory of the storage means at a same recording position on the disc-shaped recording medium.

47. The data recording apparatus according to claim 43 wherein the control means controls a scanning position of the recording head so that input data of the predetermined volume stored in the storage means are recorded on the disc-shaped recording medium during the time of writing a predetermined volume of the next input data in the storage means and, after a lapse of the time, the next input data of the predetermined volume stored in the storage means are recorded at a next record target position on the disc-shaped recording medium.

48. The data recording apparatus according to claim 43 wherein the data of the predetermined volume is one track of data on the disc-shaped recording medium.

* * * * *